US011596007B2

(12) United States Patent
Huang

(10) Patent No.: US 11,596,007 B2
(45) Date of Patent: Feb. 28, 2023

(54) SOCIAL DISTANCE DETERMINATION SYSTEM AND SOCIAL DISTANCE DETERMINATION METHOD

(71) Applicant: Wistron Corp., New Taipei (TW)

(72) Inventor: Yi-Hsi Huang, New Taipei (TW)

(73) Assignee: WISTRON CORP., New Taipei (TW)

( * ) Notice: Subject to any disclaimer, the term of this patent is extended or adjusted under 35 U.S.C. 154(b) by 29 days.

(21) Appl. No.: 17/109,280

(22) Filed: Dec. 2, 2020

(65) Prior Publication Data

US 2022/0104284 A1 Mar. 31, 2022

(30) Foreign Application Priority Data

Sep. 25, 2020 (TW) ................................ 109133212

(51) Int. Cl.
*H04W 76/10* (2018.01)
*H04W 4/06* (2009.01)

(52) U.S. Cl.
CPC ............. *H04W 76/10* (2018.02); *H04W 4/06* (2013.01)

(58) Field of Classification Search
CPC ....... H04W 76/10; H04W 4/06; H04W 4/029; G01S 11/06; G01S 5/0284
See application file for complete search history.

(56) References Cited

U.S. PATENT DOCUMENTS 10,346,480 B2 7/2019 Elgort et al.
10,616,720 B2 4/2020 Vaccari et al.
2014/0038639 A1* 2/2014 Shi ........................ H04W 64/00 455/456.1
2019/0394615 A1 12/2019 Ahn et al.

FOREIGN PATENT DOCUMENTS

CN 110557716 A 12/2019
CN 111586585 A 8/2020
CN 111651485 A 9/2020
EP 2 422 507 B1 6/2013
EP 2 939 139 B1 8/2020

OTHER PUBLICATIONS

EKF-GPR-Based Fingerprint Renovation for Subset-Based Indoor Localization with Adjusted Cosine Similarity (Published on Jan. 22, 2018) pp. 1-17.
Chinese language office action dated Sep. 11, 2021, issued in application No. TW 109133212.
Indian language office action dated Apr. 19, 2022, issued in application No. IN 202124011725.
English language translation included in Indian office action dated Apr. 19, 2022, issued in application No. IN 202124011725.

* cited by examiner

*Primary Examiner* — Joshua L Schwartz
(74) *Attorney, Agent, or Firm* — McClure, Qualey & Rodack, LLP

(57) ABSTRACT

A social distance determination system includes a first electronic device. The first electronic device is configured to establish a first communication link with a wireless base station, detect the first communication strength of the first communication link, generate a first conversion vector according to the first communication strength, and perform a similarity calculation on the first conversion vector and a second conversion vector to obtain a similarity result.

18 Claims, 4 Drawing Sheets

200

An electronic device establishes a first communication link with the wireless base station, and detects the first communication strength of the first communication link ~210

↓

The electronic device generates a first conversion vector according to the first communication strength, and performs a similarity calculation on the first conversion vector and a second conversion vector to obtain a similarity result ~220

100
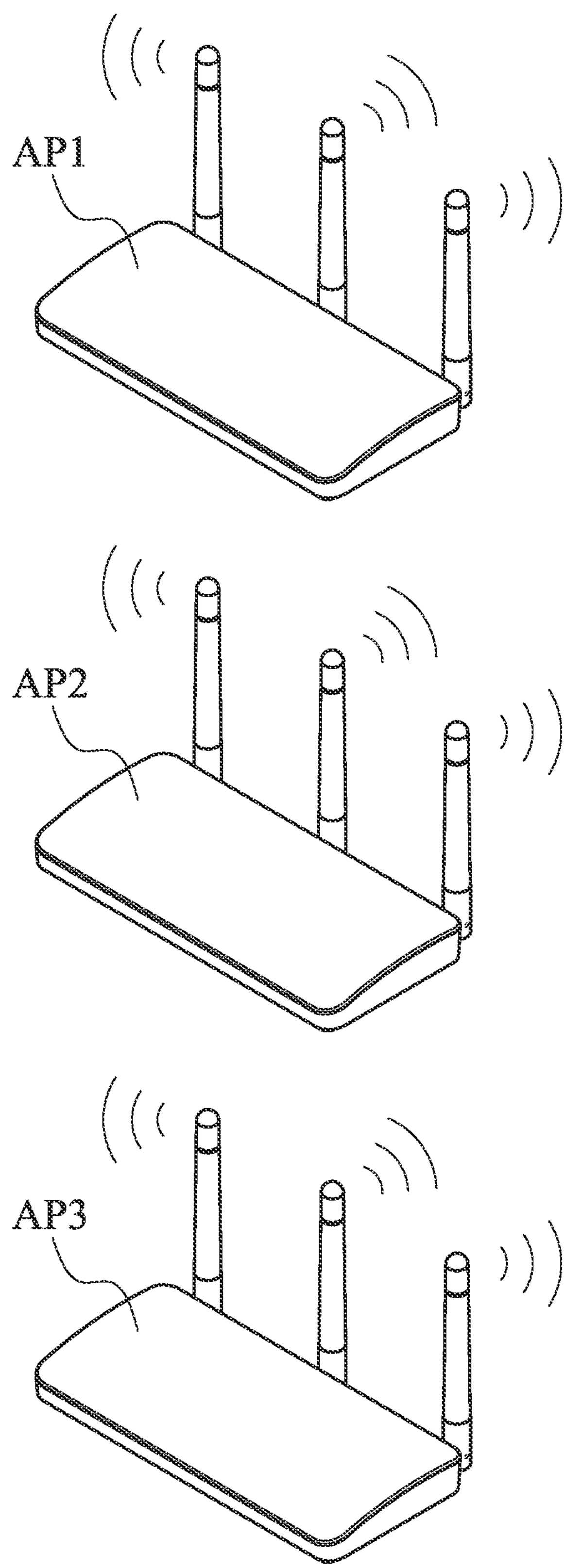
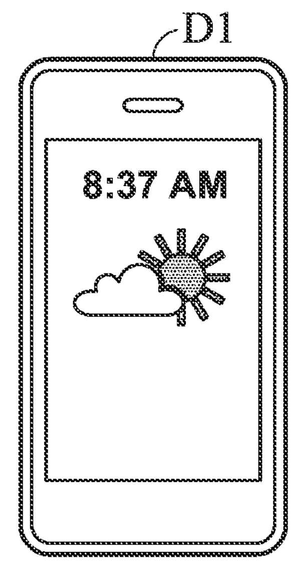
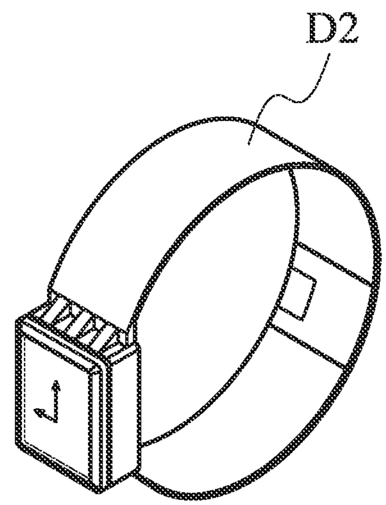
FIG. 1

Figure 2:
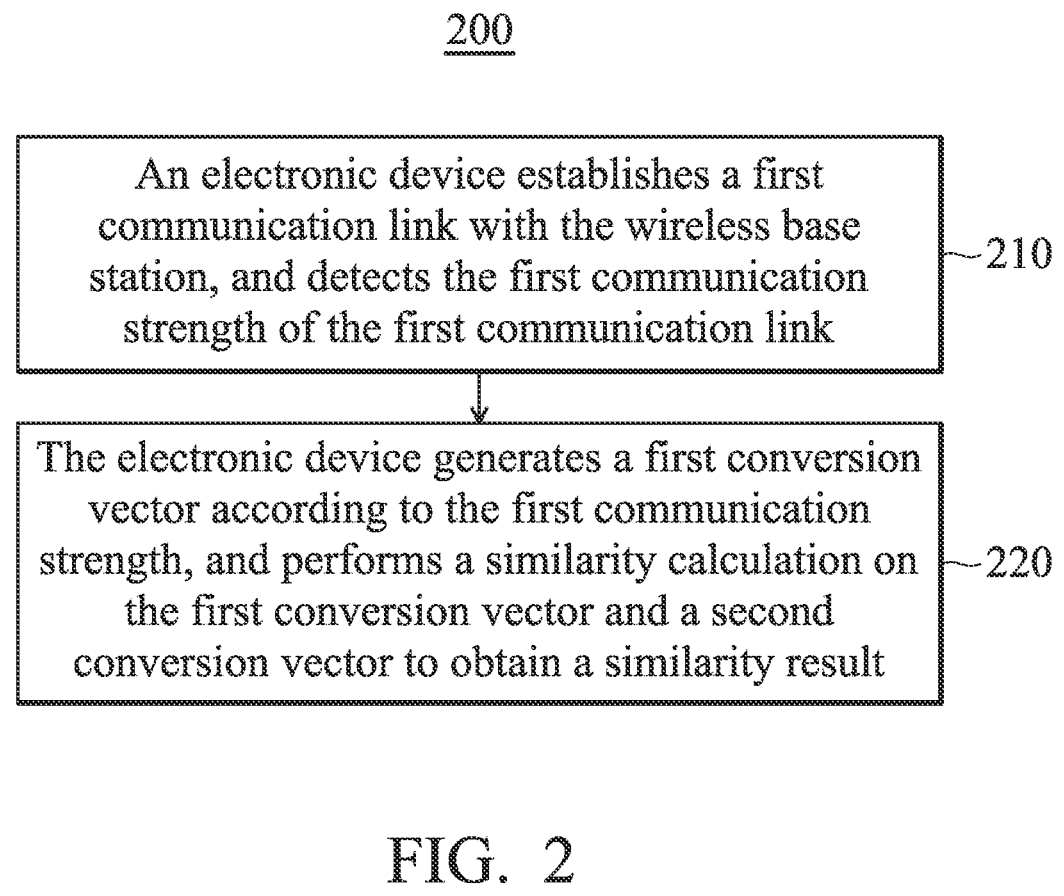

200

An electronic device establishes a first communication link with the wireless base station, and detects the first communication strength of the first communication link — 210

The electronic device generates a first conversion vector according to the first communication strength, and performs a similarity calculation on the first conversion vector and a second conversion vector to obtain a similarity result — 220

| electronic device D3 | user X |
| --- | --- |
| electronic device D2 | user Y |
| ⋮ | ⋮ |

FIG. 3

SOCIAL DISTANCE DETERMINATION SYSTEM AND SOCIAL DISTANCE DETERMINATION METHOD

CROSS REFERENCE TO RELATED APPLICATIONS

This Application claims priority of Taiwan Patent Application No. 109133212, filed on Sep. 25, 2020, the entirety of which is incorporated by reference herein.

BACKGROUND OF THE INVENTION

Field of the Invention

The present disclosure relates to a determination system and, in particular, to a social distance system and a social distance method.

Description of the Related Art

During an epidemic, maintaining social distancing is very important. Infected patients should be quarantined at home and should not go anywhere. In order to maintain social distance, we need to know whether the interaction distance between people is too close. Since people can move around freely, it is actually not feasible to use the localization method to confirm the location of each person by geographic location.

Therefore, how to detect social distance without causing additional distress to people is one of the problems that need to be solved in the field.

BRIEF SUMMARY OF THE INVENTION

In accordance with one feature of an embodiment in the present invention, the present disclosure provides a social distance determination system. The social distance determination system includes a first electronic device. The first electronic device is configured to establish a first communication link with a wireless base station, detect the first communication strength of the first communication link, generate a first conversion vector according to the first communication strength, and perform a similarity calculation on the first conversion vector and a second conversion vector to obtain a similarity result.

In accordance with one feature of an embodiment in the present invention, the present disclosure provides a social distance determination method. In the social distance determination method, a first electronic device establishes a first communication link with a wireless base station; the first communication strength of the first communication link is detected; a first conversion vector is generated according to the first communication strength; and a similarity calculation is performed on the first conversion vector and a second conversion vector to obtain a similarity result.

The social distance determination system and the social distance determination method shown in the embodiment of the present invention can calculate the similarity result through the electronic device carried by each user as long as it can be connected to the Internet. Using these similarity results, the distance between each user can be known, without causing additional distress to people. The social distance determination system and social distance determination method can be used to estimate the social distance between people during an epidemic, in order to discern whether there are clusters. When the social distance is too close, the electronic device can send out a reminder message to allow users to maintain an appropriate social distance between them, so as to prevent the spread of the disease due to clustering.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIG. 1 is a schematic diagram of a social distance determination system in accordance with one embodiment of the present disclosure.

FIG. 2 is a schematic diagram of a social distance determination method in accordance with one embodiment of the present disclosure.

FIG. 3 is a schematic diagram of a results list in accordance with one embodiment of the present disclosure.

DETAILED DESCRIPTION OF THE INVENTION

Figure 4:
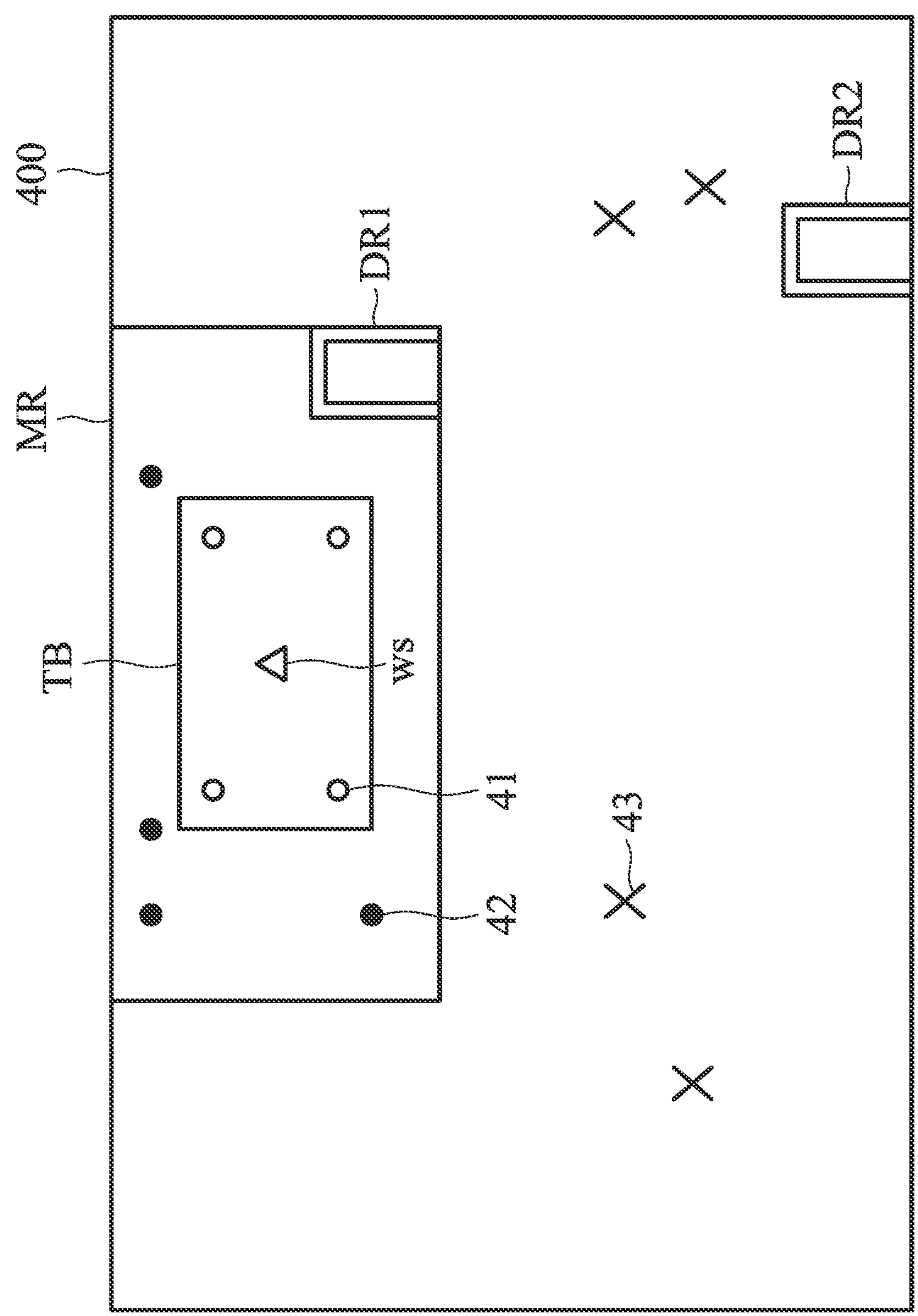
FIG. 4 is a schematic diagram of an application environment of a social distance determination system in accordance with one embodiment of the present disclosure.

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," in response to used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Please refer to FIGS. 1-2, FIG. 1 is a schematic diagram of a social distance determination system 100 in accordance with one embodiment of the present disclosure. FIG. 2 is a schematic diagram of a social distance determination method 200 in accordance with one embodiment of the present disclosure.

In one embodiment, as shown in FIG. 1, the social distance determination system 100 includes a wireless base station AP1 and an electronic device D1. In one embodiment, the electronic device D1 is communicatively connected to the wireless base station AP1, and the communication connection can be achieved through Wi-Fi or Bluetooth technology.

In one embodiment, the social distance determination system 100 includes wireless base stations AP1 to AP3 and electronic devices D1 to D2. In one embodiment, the electronic devices D1 and D2 are respectively connected to each wireless base station AP1 to AP3, and the communication connection can be realized through Wi-Fi or Bluetooth technology.

In one embodiment, the electronic devices D1 to D2 are, for example, laptops, tablets, mobile phones, smart watches, or electronic devices with communication connection capabilities. For the convenience of description, the subsequent electronic device D1 takes a mobile phone as an example, and the electronic device D2 takes a smart watch D2 as an example for illustration.

In one embodiment, the electronic devices D1 to D2 each include a processor and a storage device. In one embodiment, the processor can be implemented by an integrated circuit such as a micro controller, a microprocessor, a Digital Signal Processor (DSP), a Field Programmable Gate Array (FPGA), an Application Specific Integrated Circuit (ASIC), or a logic circuit. In one embodiment, the storage device can be realized by read-only memory, flash memory, floppy disk, hard disk, optical disk, flash drive, tape, network accessible database or storage medium with the same function. In one embodiment, the electronic devices D1 to D2 each further includes a communication circuit, for example, Wi-Fi, Bluetooth, or other communication devices can be used to establish a communication link with other devices.

In step 210, an electronic device D1 establishes a first communication link with the wireless base station AP1, and detects the first communication strength of the first communication link.

In one embodiment, the electronic device D1 can detect the received signal strength index (RSSI) of the first communication as the first communication strength.

In step 220, the electronic device D1 generates a first conversion vector according to the first communication strength, and performs a similarity calculation on the first conversion vector and a second conversion vector to obtain a similarity result.

In one embodiment, the electronic device D1 establishes a first communication link with each wireless base station AP1 to AP3, and detects the first communication strength of each first communication link. The electronic device D1 generates a first conversion vector according to the first communication strengths, and similarity calculations are performed on the first conversion vector and the second conversion vector to obtain a similarity result.

For example, if the first communication link is implemented by Wi-Fi, the electronic device D1 can detect the communication strength of the Wi-Fi signal (such as RSSI). For example, the communication strength between the electronic device D1 and the wireless base station AP1 is −48, the communication strength between the electronic device D1 and the wireless base station AP2 is −48, and the communication strength between the electronic device D1 and the wireless base station AP3 is −40. The electronic device D1 generates conversion vectors based on these first communication strengths. Each vector value can be −48, −48, −40, respectively. The first conversion vector representation method is, for example, $$V1 = \begin{bmatrix} -48 \\ -48 \\ -40 \end{bmatrix},$$

and the similarity calculation is performed on the first conversion vector and the second conversion vector, the representation of the second conversion vector is, for example, $$V2 = \begin{bmatrix} -51 \\ -51 \\ -53 \end{bmatrix},$$

so as to obtain the similarity result. Each vector value can correspond to the identification code of the wireless base station or Mac Address, for example, the vector value −48 corresponds to the Mac Address of the wireless base station AP1. Thus, it can be recognized that the communication strength of the wireless base station AP1 is −48, so that the communication strength of −48 detected by the electronic device D1 can be mapped to the wireless base station AP1, and the conversion vector is formed through the Mac Address of the wireless base station AP1 and the communication strength of each wireless base station. In another embodiment, each vector value in each conversion vector is formed in a predetermined sequence of wireless base stations. For example, the communication strength of the wireless base station AP1 is the first vector value in each conversion vector, the communication strength of the wireless base station AP2 is the second vector value in each conversion vector, and so on. If the electronic device does not form a communication link with the corresponding wireless base station, the vector value of the corresponding wireless base station in the conversion vector will be represented by 0.

In one embodiment, the similarity calculation can be applied in multiple ways, which will be described in detail later.

In one embodiment, the first electronic device D1 detects the first communication strength at a first time stamp to obtain a first time point communication strength, detects the first communication strength at a second time stamp to obtain a second time point communication strength, and performs the similarity calculation on the first time point communication strength and the second time point communication strength to obtain the similarity result. In an embodiment, the second conversion vector can be the second time point communication strength.

In one embodiment, a server is used to collect data uploaded by multiple electronic devices (such as electronic device D1 and electronic device D2). For example, the first conversion vector or the second conversion vector is transmitted to the server every preset time period, the first conversion vector is uploaded by the electronic device D1, and the second conversion vector is uploaded by the electronic device D2, so that the server performs similarity calculation to get similarity results.

For example, the electronic device D1 detects that the first communication strength is −30 at a first time stamp, and detects the first communication strength at a second time stamp to obtain a second time point communication strength of −40. The electronic device D1 can perform a similarity calculation on the first time point communication strength −30 and the second time point communication strength −40 to obtain a similarity result.

In one embodiment, as shown in FIG. 1, the electronic device D2 establishes a second communication link with each wireless base station AP1 to AP3, detects a second communication strength of each second communication link, and generates the second conversion vector according to the second communication strength. For example, this second conversion vector is expressed as $$V2 = \begin{bmatrix} -51 \\ -51 \\ -53 \end{bmatrix}.$$

In this embodiment, the same electronic device (for example, electronic device D2) detects the communication strength of each wireless base station AP1 to AP3 at the same time point to generate a conversion vector representation (for example, V2).

For another example, the electronic device D1 detects that the first communication strength is −30 at a first time stamp (considered as the first time point communication strength). And, the electronic device D1 detects at a second time stamp that the first communication strength is −50 (considered as the second time point communication strength). The conversion vector expression method is $$V1 = \begin{bmatrix} -30 \\ -50 \end{bmatrix}.$$

The electronic device D2 detects that the first communication strength is −80 at a first time stamp (considered as the first time point communication strength). And, the electronic device D2 detects that the first communication strength is −90 at a second time stamp (considered as the second time point communication strength). The conversion vector representation method is $$V2 = \begin{bmatrix} -80 \\ -90 \end{bmatrix}.$$

The electronic device D1 or the electronic device D2 performs the similarity calculations on the conversion vector of the first time point communication strength $$V1 = \begin{bmatrix} -30 \\ -50 \end{bmatrix}$$

and the conversion vector of the second time point communication strength $$V2 = \begin{bmatrix} -80 \\ -90 \end{bmatrix}$$

to obtain similarity results. In this embodiment, the communication strength detected by the same electronic device (e.g., electronic device D2) at two time points is used to generate a conversion vector representation (e.g., conversion vector V2).

In one embodiment, the first electronic device D1 determines the similarity result according to a preset threshold (e.g., 0.07). In response to the first electronic device D1 determines that the similarity result is greater than the preset threshold, the positions of the first electronic device D1 is regarded as having no difference at the first time stamp and the second time stamp. In response to the first electronic device D1 determines that the similarity result is not greater than the preset threshold, the position of the first electronic device D1 is regarded as being different at the first time stamp than it is at the second time stamp. In this embodiment, the electronic device D1 determines the similarity between the conversion vector V1 of the first time stamp and the conversion vector V2 of the second time stamp.

In one example, the similarity result can be used to determine whether the home quarantine person has left the home. In response to the similarity result between the first time point communication strength and the second time point communication strength approaches 0, it means that the user holding the electronic device D1 (such as a mobile phone) or the electronic device D2 (such as a smart watch) may move a large distance in the time interval from the first time point to the second time point (home quarantine person may have left the range of home). In response to the similarity result between the first time point communication strength and the second time point communication strength is close to or equal to 1, it means that user who hold electronic device D1 (such as a mobile phone) or electronic device D2 (such as a smart watch) may have a small moving distance within the time interval or did not move (home quarantine person may not leave the range of home).

In one embodiment, the first electronic device D1 determines the similarity result according to the T-test statistical verification. For example, according to the T-test statistics, the similarity results of multiple pieces of data in a time interval (such as the conversion vector V1 of the first time stamp and the conversion vector V2 of the second time stamp of the electronic device D1 and the electronic device D2) are verified. In response to the first electronic device D1 determines that the similarity result is greater than a P value (P value, for example, 0.05) according to the T-test statistical verification, the positions of the first electronic device D1 and the second electronic device D2 are regarded as having no difference. In response to the first electronic device D1 determines that the similarity result is not greater than the P value according to the T-test statistical verification, the positions of the first electronic device D1 and the second electronic device D2 are regarded as being different.

In one embodiment, the electronic device is not limited to the electronic device D1 and the electronic device D2 shown in FIG. 1, and the number of electronic devices can be more. For example, the electronic device includes electronic device D1, electronic device D2, and electronic device D3. Each of the electronic devices D1 to D3 establishes a current communication link with the wireless base station AP1 to AP3, detects the current communication strength of the current communication link, and generates a current conversion vector according to the current communication strength. And, the current conversion vector is calculated by one of the electronic devices D1 to D3, or calculated by the server to perform similarity calculations to obtain similarity results. According to the similarity results, the distance between the electronic device D2 and the electronic device D1, and the distance between the electronic device D3 and the electronic device D1 are estimated, then, the electronic device D2 and the electronic device D3 are sorted from nearest to farthest to generate a results list.

For example, please refer to FIG. 3, which is a schematic diagram of a results list 300 in accordance with one embodiment of the present disclosure. A user who wears electronic device D1 at 3 to 4 P.M. yesterday is diagnosed, according to the similarity result, the location similarity of other electronic devices (for example, electronic device D2, electronic device D3) and electronic device D1 is listed from high similarity to low similarity. In the exemplary results list shown in FIG. 3, the distance between the electronic device D3 and the electronic device D1 is the closest, the user of the electronic device D3 is X, and the user of the electronic device D2 is Y. In this way, the disease control personnel can know that the user X and the user Y may be in contact with the confirmed person, and their respective contact distances. In one embodiment, the electronic devices D1 to D3 or the server can use vectors to calculate the distances.

In one embodiment, the similarity calculation is calculated by applying a Euclidean distance or a cosine similarity algorithm.

In one embodiment, the similarity calculation can also be calculated by using Euclidean distance, and the formula of Euclidean distance is as follows:

$$D(A,B)=\sqrt{(A_1-B_1)^2+(A_2-B_2)^2+\ldots+(A_n-B_n)^2}$$

Assuming:

$$A=[A_1,A_2,A_3]=[-30,-40,-50]$$

$$B=[B_1,B_2,B_3]=[-70,-80,-90]$$

$$D(A,B)=\sqrt{(-30-(-70))^2+(-40-(-80))^2+(-50-(-90))^2}$$

$$D(A,B)=69.28$$

A and B are examples of conversion vectors, and 69.28 is used as the similarity result. In this embodiment, the similarity result can be output for comparison or ranking, or when the similarity result is judged to be greater than a similarity threshold (for example, 40), it will be regarded as a position difference.

In one embodiment, the formula of the cosine similarity algorithm is:

$$\text{similarity}=\cos(\theta)=\frac{A\cdot B}{\|A\|\|B\|}=\frac{\sum_{i=1}^{n}A_iB_i}{\sqrt{\sum_{i=1}^{n}A_i^2}\sqrt{\sum_{i=1}^{n}B_i^2}}$$

The symbols A and B can be conversion vectors, and the result of this formula is the similarity result (hereinafter referred to as Cosine Similarity), assuming:

$$A=[A_1,A_2,A_3]=[-30,-40,-50]$$

$$B=[B_1,B_2,B_3]=[-70,-80,-90]$$

$$A\cdot B=A_1*B_1+A_2*B_2+A_3*B_3=(-30)\cdot(-70)+(-40)\cdot(-80)+(-50)\cdot(-90)=2100+3200+4500=9800$$

$$\|A\|=\sqrt{A_1^2+A_2^2+A_3^2}=\sqrt{(-30)^2+(-40)^2+(-50)^2}=\sqrt{5000}$$

$$\|B\|=\sqrt{B_1^2+B_2^2+B_3^2}=\sqrt{(-70)^2+(-80)^2+(-90)^2}=\sqrt{19400}$$

$$\cos(\theta)=\frac{9800}{\sqrt{5000}*\sqrt{19400}}=0.995$$

Here will extend a question, if we change B to [−30,−40,−50], then cos(θ)=1, Cosine Similarity is not obvious for different strength considerations. Generally speaking, 0.995 and 1 are considered similar numbers. In other words, there is too little consideration in the strength part, so the collected RSSI is added to a value, because the RSSI falls between −30 and −100, so the RSSI value is added −1*(−30+(−100))/2=65. The main purpose of adding this value is to make the performance of Cosine Similarity of different strength levels more obvious. In other words, Cosine Similarity can be combined with the signal strength calculation to adjust the weight of the similarity result. Using the example above, the above conversion vectors A and B can be adjusted to A' and B' in the following way:

$$A'=[A_1+65,A_2+65,A_3+65]=[-30+65,-40+65,-50+65]=[35,25,15]$$

$$B'=[B_1+65,B_2+65,B_3+65]=[-70+65,-80+65,-90+65]=[-5,-15,-25]$$

At this point, it can be seen that the direction of the conversion vector has been different, and the conversion vector of A' and B' can then be used to calculate the Cosine Similarity:

$$A'\cdot B'=A_1'*B_1'+A_2'*B_2'+A_3'*B_3'=(35)\cdot(-5)+(25)\cdot(-15)+(15)\cdot(-25)=-925$$

$$\|A'\|=\sqrt{A_1'^2+A_2'^2+A_3'^2}=\sqrt{(35)^2+(25)^2+(15)^2}=\sqrt{2075}$$

$$\|B'\|=\sqrt{B_1'^2+B_2'^2+B_3'^2}=\sqrt{(-5)^2+(-15)^2+(-25)^2}=\sqrt{875}$$

$$\cos(\theta)=-\frac{925}{\sqrt{2075}*\sqrt{875}}=-0.686$$

From this we can see the difference in Cosine Similarity.

In one embodiment, the electronic device D1 can combine Cosine Similarity with frequency calculation to adjust the weight of the similarity result. Assuming that the electronic device D1 is a mobile phone, several pieces of information can be collected: the strength and frequency of all scanned Wi-Fi wireless base stations (for example: 2G, 5G), and the media access control address of the wireless base station (Mac Address). The Mac Address of each wireless base station is unique and can be used as the key of the field. Due to the complexity of the office environment, many wireless base stations may be scanned. The following takes the first three strong signals as an example for calculation. Assuming that the frequencies of the three signals scanned per second within 30 seconds are 30, 25, and 29 respectively, and the frequencies are all 2G, it can be sorted into the following table 1:

TABLE 1

| Mac Address of the wireless base station | strength |
|---|---|
| e0:1c:41:d8:48:54 | −48 |
| e0:1c:41:d8:48:55 | −48 |
| 02:9f:c2:61:d6:0c | −50 |

Then, the frequency is converted to weight. The calculation of weight is for example 30/(30+25+29), 25/(30+25+29), 29/(30+25+29), so the information can be sorted into table 2 shows:

TABLE 2

| Mac Address of the wireless base station | Current strength | The frequencies scanned within 30 seconds | Weight |
|---|---|---|---|
| e0:1c:41:d8:48:54 | −48 | 30 | 0.357 |
| e0:1c:41:d8:48:55 | −48 | 25 | 0.297 |
| 02:9f:c2:61:d6:0c | −50 | 29 | 0.346 |

Based on the above data, the value of w-cosine can be calculated.

$$V1 = \begin{bmatrix} -48 \\ -48 \\ -50 \end{bmatrix};$$

$$V2 = \begin{bmatrix} -51 \\ -51 \\ -53 \end{bmatrix}$$

In practice, the RSSI will be shifted, and the value of RSSI is about −30 to −100. Therefore, adding −65((−30+(−100))/2) makes the difference between a strong signal and a weak signal more obvious. For example, the strong signal −30+65 becomes 35, and the weak signal −80+65 becomes −15. The positive and negative of the two are opposite to achieve the purpose of separating the strong signal from the weak signal. In practice, there will be a situation where −65+65 is zero. In this case, a value close to zero but not zero can be specified. According to the formula of w-cosine, the number of occurrences in 30 seconds is used as the weight. This can be calculated as follows:

$$\omega-\cos(\theta) = \frac{\text{weight}(y) \times rssi_x \times rssi_y}{\sqrt{\sum_1^{n_1} \text{weight}(y) \times rssi_x^2} \times \sqrt{\sum_1^{n_1} \text{weight}(y) \times rssi_y^2}}$$

$$0.357*(-48+65)*(-51+65)+0.297*(-48+65)*(-51+65)+0.346*(-50+65)*(-53+65) = 217.93$$

$$0.357*(-48+65)^2+0.297*(-48+65)^2+0.346*(-50+65)^2 = 178.00$$

$$0.357*(-51+65)^2+0.297*(-51+65)^2+0.346*(-53+65)^2 = 266.85$$

$$\omega-\cos(\theta) = \frac{217.93}{\sqrt{178} \times \sqrt{266.85}} = 0.99$$

w-cos(θ) will be between −1 and 1. The closer to 1, the closer the two vectors are. And, the closer the two electronic devices (such as electronic device D1 and electronic device D2) are. In this example, 0.99 means that the two electronic devices are highly close. Suppose that after substituting other values and performing the above calculations, the value of w-cos(θ) is 0.51, which means that w-cos(θ) becomes smaller, which means that the electronic device (such as electronic device D1, electronic device D2) has moved or moved away each other. In one embodiment, the electronic device (for example, electronic device D1 or electronic device D2) can set a cosine similarity threshold in advance, since w-cos(θ) will be between −1 and 1, the closer 1 means the closer the two vectors are. When the electronic device (such as electronic device D1 or electronic device D2) determines that w-cos(θ) is less than the cosine similarity threshold, it is determined that the electronic device (such as electronic device D1 or electronic device D2) has moved or moved away from each other.

In one embodiment, the electronic device D1 can combine the Cosine Similarity with the Softmax operation to adjust the weight of the similarity result. The following first describes the Softmax calculation formula, this formula returns a sequence that represents the weight of each element:

$$\sigma(z)_j = \frac{e^{z_j}}{\sum_{k=1}^{K} e^{z_k}} \text{ for } j = 1, \ldots, K.$$

Suppose we get a sequence: L=[1, 2, 3, 4]. The numbers can be obtained firstly:

$$\sum_{k=1}^{4} e^{zk} = e^1 + e^2 + e^3 + e^4 = 2.718 + 7.389 + 20.085 + 54.598 = 84.79$$

$$\sigma(z_1) = 2.718/84.79 = 0.032$$

$$\sigma(z_2) = 7.389/84.79 = 0.087$$

$$\sigma(z_3) = 20.085/84.79 = 0.236$$

$$\sigma(z_4) = 54.598/84.79 = 0.645$$

Therefore, Softmax(L)=[0.032, 0.087, 0.236, 0.645].

In one embodiment, the electronic device D1 can combine Cosine Similarity with Softmax to adjust the weight of the similarity result, the formula is as follows:

$$\omega-\cos(\theta) = \frac{\sum \text{softmax}(rssi\,level_x) \times (rssi_x + 65) \times (rssi_y + 65)}{\sqrt{\sum_1^{n_1} \text{softmax}(rssi\,level_x) \times (rssi_x + 65)^2} \times \sqrt{\sum_1^{n_2} \text{softmax}(rssi\,level_x) \times (rssi_y + 65)^2}}$$

The symbol y is the value retained in the previous time stamp for comparison, and the symbol x is the value newly entered in the Wi-Fi RSSI table.

$$y=[y_1,y_2,y_3]=[-30,-40,-50]$$

$$x=[x_1,x_2,x_3]=[-70,-80,-90]$$

The corresponding RSSI levels are:

$$l=[2,1,1]$$

$$\text{softmax}(l)=[0.576,0.212,0.212]$$

$$\Sigma\text{softmax}(\text{rssi level}_x)\times(\text{rssi}_x+65)\times(\text{rssi}_x+65)=0.576*(-70+65)*(-30+65)+0.212*(-80+65)*(-40+65)+0.212*(-90+65)+0.212*(-50+65)=-29.78$$

$$\Sigma_1^{n1}\text{ softmax}(\text{rssi level}_x)\times(\text{rssi}_x+65)^2=0.576*(-70+65)^2+0.212*(-80+65)^2+0.212*(-90+65)^2=885.89$$

$$\sqrt{\Sigma_1^{n2}\text{softmax}(\text{rssilevel}_x)\times(\text{rssi}_y+65)^2}=0.576*(-30+65)^2+0.212*(-40+65)^2+(-50+65)^2=194.55$$

$$\omega-\cos(\theta)=-29.78/(\sqrt{885.89}*\sqrt{194.55})=-0.625$$

The similarity result after adjusting the weight is obtained by the above calculation.

In one embodiment, the aforementioned w-cosine can be regarded as a similarity result.

It can be seen from the above that the similarity calculation can be selectively combined with a Softmax calculation, a frequency calculation, or a signal strength calculation to adjust the weight of the similarity results, and output the adjusted similarity results for comparison or ranking.

Please refer to FIG. 4, FIG. 4 is a schematic diagram of an application environment of a social distance determination system in accordance with one embodiment of the present disclosure. In FIG. 4, office 400 has a door DR2, office 400 has a meeting room MR. The meeting room MR has a door DR1, and meeting room MR has a table TB. Regarding the w-cosine similarity as the similarity result, the comparison reference point ws of the w-cosine similarity is located in the middle of the table TB, represented by a hollow triangle. In this example, the electronic device D1 can be regarded as the comparison reference point ws of the w-cosine similarity, and the other sampling points 41 to 43 can be regarded as the electronic device D2. The electronic device D1 can calculate the comparison between the reference point ws and other sampling points 41 on the table TB (represented by a hollow circle), and the comparison reference point ws and other sampling points 42 (represented by a solid circle) in the meeting room MR, and the calculated result is that P value is 0.278, greater than 0.05. Therefore, the w-cosine similarities between sampling point 41 and the comparison reference point ws and between sampling point 42 and the comparison reference point ws are not different, which means that these sampling points 41 and 42 are very similar to the comparison reference point ws (if someone is sick, it may be that people located at these sampling points are more likely to be infected). On the other hand, the P value between sampling point 41 and sampling point 43 is 0.0001, which is less than 0.05, and the P value between sampling point 42 and sampling point 43 is 0.0002, which is less than 0.05. Therefore, the similarities between sampling point 41 and sampling point 42 are separately different from sampling point 43, which means that these sampling points 41 and 42 are not close to sampling point 43 (if there is a sick person at sampling point 41 or 42, people at sampling point 43 have a lower chance of being infected).

The social distance determination system and the social distance determination method shown in the embodiment of the present invention can calculate the similarity result through the electronic device carried by each user as long as it can be connected to the Internet. Through the similarity results, the distance between each user can be known, without causing additional distress to people. The social distance determination system and social distance determination method can be used to estimate the social distance between people during the epidemic, in order to know if there are clusters. Even when the social distance is too close, the electronic device can send out a reminder message to allow users to maintain an appropriate social distance between them, so as to prevent the spread of the epidemic due to clusters.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A social distance determination system, comprising:

a first electronic device, configured to establish a first communication link with a wireless base station, detect a first communication strength of the first communication link, generate a first conversion vector according to the first communication strength, and calculate a similarity calculation by using Euclidean distance between the first conversion vector and a second conversion vector to obtain a similarity result;

wherein the similarity calculation is calculated by applying the Euclidean distance between the first conversion vector and the second conversion vector or a cosine similarity algorithm;

wherein in response to the similarity calculation using the Euclidean distance calculation, and the first electronic device determines that the similarity result is greater than a similarity threshold, position of the first electronic device and position of a second electronic device corresponding to the second conversion vector are regarded as being different.

2. The social distance determination system of claim 1, further comprising:

a plurality of wireless base stations;

wherein the first electronic device establishes the first communication link with each of the wireless base stations, detects the first communication strength of each of the first communication links, and generates the first conversion vector according to the first communication strengths, and performs the similarity calculation on the first conversion vector and the second conversion vector to obtain the similarity result.

3. The social distance determination system of claim 2, further comprising:

a second electronic device, configured to establish a second communication link with each of the wireless base stations, to detect a second communication strength of each of the second communication links, and to generate the second conversion vector according to the second communication strengths.

4. The social distance determination system of claim 1, wherein the first electronic device detects the first communication strength at a first time stamp to obtain a first time point communication strength, generates the first conversion vector according to the first time point communication strength, detects the first communication strength at a second time stamp to obtain a second time point communication strength, generates the second conversion vector according to the second time point communication strength, and performs the similarity calculation on the first time point communication strength and the second time point communication strength to obtain the similarity result.

5. The social distance determination system of claim 1, wherein the similarity calculation combines a Softmax calculation by the first electronic device, and a frequency calculation or a signal strength calculation is used to adjust a weight of the similarity result.

6. The social distance determination system of claim 3, wherein the first electronic device determines the similarity result according to a T-test statistical verification;

in response to the first electronic device determining that the similarity result is greater than a P value according to the T-test statistical verification, positions of the first electronic device and the second electronic device are regarded as having no difference; and in response to the first electronic device determining that the similarity result is not greater than the P value according to the T-test statistical verification, positions of the first electronic device and the second electronic device are regarded as being different.

7. The social distance determination system of claim 3, wherein the first electronic device determines the similarity result according to a preset threshold;

in response to the first electronic device determining that the similarity result is greater than the preset threshold, positions of the first electronic device and the second electronic device are regarded as having no difference; and in response to the first electronic device determining that the similarity result is not greater than the preset threshold, positions of the first electronic device and the second electronic device are regarded as being different.

8. The social distance determination system of claim 4, wherein the first electronic device determines the similarity result according to a preset threshold;

in response to the first electronic device determining that the similarity result is greater than the preset threshold, positions of the first electronic device is regarded as having no difference at the first time stamp and the second time stamp; and in response to the first electronic device determining that the similarity result is not greater than the preset threshold, positions of the first electronic device are regarded as being different at the first time stamp and the second time stamp.

9. The social distance determination system of claim 3, further comprising:

a plurality of electronic devices;

wherein the electronic devices comprise the first electronic device, the second electronic device and a third electronic device; the electronic devices each establishes a current communication link with the wireless base stations, and detects a current communication strength of each current communication link, generates a current conversion vector according to the current communication strengths, and performs the similarity calculation on the current conversion vector to obtain a similarity result;

wherein the first electronic device sorts the second electronic device and the third electronic device from nearest to farthest to generates a results list according to the similarity result, wherein the first electronic device estimates a distance between the second electronic device and the first electronic device and a distance between the first electronic device and the third electronic device according to the similarity result.

10. A social distance determination method, comprising:

establishing a first communication link with a wireless base station and detecting the first communication strength of the first communication link, by a first electronic device;

generating a first conversion vector according to the first communication strength: and calculating a similarity calculation by using Euclidean distance between the first conversion vector and a second conversion vector to obtain a similarity result;

wherein the step of performing a similarity calculation comprises:

applying the Euclidean distance between the first conversion vector and the second conversion vector or a cosine similarity algorithm;

wherein in response to the similarity calculation using the Euclidean distance calculation, and when the first electronic device determines that the similarity result is greater than a similarity threshold, position of the first electronic device and position of a second electronic device corresponding to the second conversion vector are regarded as being different.

11. The social distance determination method of claim 10, further comprising:

establishing the first communication link with each of a plurality of wireless base stations, and detecting the first communication strength of each of the first communication links; and generating the first conversion vector according to the first communication strengths, and performing the similarity calculation on the first conversion vector and the second conversion vector to obtain a similarity result.

12. The social distance determination method of claim 11, further comprising:

establishing a second communication link with each of the wireless base stations, detecting a second communication strength of each of the second communication links, and generating the second conversion vector according to the second communication strengths, by a second electronic device.

13. The social distance determination method of claim 10, wherein the first electronic device detects the first communication strength at a first time stamp to obtain a first time point communication strength, generates the first conversion vector according to the first time point communication strength, detects the first communication strength at a second time stamp to obtain a second time point communication strength, generates the second conversion vector according to the second time point communication strength, and performs the similarity calculation on the first time point communication strength and the second time point communication strength to obtain a similarity result.

14. The social distance determination method of claim 10, wherein the step of performing a similarity calculation further comprises:

combining a Softmax calculation; a frequency calculation or a signal strength calculation is used to adjust a weight of the similarity result.

15. The social distance determination method of claim 12, wherein the social distance determination method further comprises:

determining the similarity result by the first electronic device according to the T-test statistical verification;

in response to the first electronic device determining that the similarity result is greater than a P value according to the T-test statistical verification, positions of the first electronic device and the second electronic device are regarded as having no difference; and in response to the first electronic device determining that the similarity result is not greater than the P value according to the T-test statistical verification, positions of the first electronic device and the second electronic device are regarded as being different.

16. The social distance determination method of claim 12, wherein the social distance determination method further comprises:

determining the similarity result by the first electronic device according to a preset threshold;

in response to the first electronic device determining that the similarity result is greater than the preset threshold, positions of the first electronic device and the second electronic device are regarded as having no difference; and in response to the first electronic device determining that the similarity result is not greater than the preset threshold, positions of the first electronic device and the second electronic device are regarded as being different.

17. The social distance determination method of claim 13, wherein the social distance determination method further comprises:

determining the similarity result by the first electronic device according to a preset threshold;

in response to the first electronic device determining that the similarity result is greater than the preset threshold, positions of the first electronic device are regarded as having no difference at the first time stamp and the second time stamp; and in response to the first electronic device determining that the similarity result is not greater than the preset threshold, positions of the first electronic device are regarded as being different at the first time stamp and the second time stamp.

18. The social distance determination method of claim 12, further comprising:

establishing a current communication link with each of the wireless base stations by a plurality of electronic devices, wherein the electronic devices comprise the first electronic device, the second electronic device and a third electronic device;

detecting the current communication strength of each current communication link and generating a current conversion vector according to the current communication strengths by the electronic devices; and performing a similarity calculation on the current conversion vector to obtain a similarity result by the electronic devices;

wherein the first electronic device sorts the second electronic device and the third electronic device from nearest to farthest to generates a results list according to the similarity result, wherein the first electronic device estimates a distance between the second electronic device and the first electronic device and a distance between the first electronic device and the third electronic device according to the similarity result.

* * * * *